(12) United States Patent
Suzuki et al.

(10) Patent No.: US 7,150,937 B2
(45) Date of Patent: *Dec. 19, 2006

(54) NON-AQUEOUS ELECTROLYTE SECONDARY BATTERY AND NEGATIVE ELECTRODE FOR THE SAME

(75) Inventors: Kohei Suzuki, Yao (JP); Kazunori Kubota, Moriguchi (JP); Motoi Kawamura, Kadoma (JP); Akira Kuroda, Hirakata (JP); Masao Fukunaga, Osaka (JP); Tsumoru Ohata, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/943,839

(22) Filed: Sep. 20, 2004

(65) Prior Publication Data

US 2005/0031955 A1 Feb. 10, 2005

Related U.S. Application Data

(62) Division of application No. 10/883,727, filed on Jul. 6, 2004, which is a division of application No. 09/845,265, filed on May 1, 2001, now Pat. No. 6,773,838.

(30) Foreign Application Priority Data

Sep. 4, 2000 (JP) ............... 2000-267626
Sep. 4, 2000 (JP) ............... 2000-267627

(51) Int. Cl.
*H01M 2/14* (2006.01)
(52) U.S. Cl. .............. 429/129; 429/231.8; 429/232; 429/137; 429/231.1; 429/217; 429/213; 429/94; 429/326; 429/336; 429/218.1

(58) Field of Classification Search .............. 429/128, 429/129, 231.8, 232, 137, 231.1, 217, 213, 429/218.1, 94, 326, 336
See application file for complete search history.

(56) References Cited

U.S. PATENT DOCUMENTS 4,873,277 A 10/1989 Boutni (Continued)

FOREIGN PATENT DOCUMENTS

EP 0 735 093 A1 10/1996

(Continued)

OTHER PUBLICATIONS

"Koubunshi Handbook". Research Group of the Japan Society for Analytical Chemistry, ed. (1989).
"Explanation for he IR Spectrum", Infrared Absorption Spectrum, Translation of a corresponding part as boxed in the attached copy of p. 925.

*Primary Examiner*—Patrick Joseph Ryan
*Assistant Examiner*—Jane Rhee
(74) *Attorney, Agent, or Firm*—McDermott Will & Emery LLP

(57) ABSTRACT

A non-aqueous electrolyte battery is provided, which exhibits good high-rate discharge characteristics and low-temperature characteristics and ensures high safety when the negative electrode contains 0.6 to 1.7 parts by weight of a particulate modified styrene-butadiene rubber as a binder and 0.7 to 1.2 parts by weight of a thickening agent so that the total amount of the binder and thickening agent is 1.3 to 2.4 parts by weight per 100 parts by weight of a carbon material as an active material, and the concentration of $LiPF_6$ in the non-aqueous electrolyte is 0.6 to 1.05 mole/liter. The surface area of the active material effectively contributable to charging and discharging reaction is sufficient when the surface area of the carbon material per 1 g of the binder contained in the negative electrode is 300 to 600 $m^2$.

5 Claims, 5 Drawing Sheets

U.S. PATENT DOCUMENTS

| | | | |
|---|---|---|---|
| 5,378,560 A | | 1/1995 | Tomiyama |
| 5,514,495 A | * | 5/1996 | Klaus .................. 429/217 |
| 5,707,763 A | | 1/1998 | Shimizu et al. |
| 5,721,069 A | * | 2/1998 | Shoji et al. ............ 429/213 |
| 6,114,065 A | * | 9/2000 | Inoue et al. ........... 429/231.8 |
| 6,555,268 B1 | | 4/2003 | Inoue et al. |
| 6,573,004 B1 | | 6/2003 | Igarashi et al. |
| 2001/0053475 A1 | | 12/2001 | Ying et al. |

FOREIGN PATENT DOCUMENTS

| | | |
|---|---|---|
| EP | 1 009 057 A1 | 6/2000 |
| EP | 1 096 592 A1 | 5/2001 |
| FR | 2 553 937 | 4/1985 |
| JP | 5-226004 | 9/1993 |
| JP | 9-199135 | 7/1997 |
| JP | 9-213337 | 8/1997 |
| JP | 9-320604 | 12/1997 |
| JP | 10-279606 | 10/1998 |
| JP | 11-111300 | 4/1999 |
| JP | 11-288718 | 10/1999 |
| JP | 11-310405 | 11/1999 |
| JP | 11-339810 | 12/1999 |
| JP | 2000-067871 | 3/2000 |
| JP | 2000-228224 | 8/2000 |
| WO | WO 98/39808 | 9/1998 |
| WO | WO 99/63612 | 12/1999 |

* cited by examiner

NON-AQUEOUS ELECTROLYTE SECONDARY BATTERY AND NEGATIVE ELECTRODE FOR THE SAME

This application is a divisional of application Ser. No. 10/883,727 filed Jul. 6, 2004 which is a divisional of application Ser. No. 09/845,265 filed May 1, 2001 now U.S. Pat. No. 6,773,838.

BACKGROUND OF THE INVENTION

Non-aqueous electrolyte secondary batteries used as electric power sources for portable electronic equipments in recent years include a lithium-containing transition metal oxide in the positive electrode and a carbon material capable of absorbing and desorbing lithium in the negative electrode, thereby having high power and high energy density. The positive and negative electrodes include respective binders for binding active material particles together. As the binder in the negative electrode, used are polyvinylidene difluoride (PVDF) or styrene-butadiene rubber (SBR), for example.

To impart sufficient strength to the negative electrode, it is necessary to mix a large amount of binder with a negative electrode active material such as the above carbon material. If a large amount of binder is used, however, the surface of the carbon material is covered with the binder. This reduces the surface area of the carbon material contributable to charging and discharging reaction, and thus deteriorates the high-rate discharge characteristics and the low-temperature characteristics of the battery. To compensate this, the salt concentration in the non-aqueous electrolyte must be increased.

However, increase of the salt concentration will enhance the reactivity of the electrolyte when the battery is under a high temperature and overcharged. Therefore, the battery temperature tends to easily rise, and thus the safety may be impaired.

In addition, if most of the surface of the carbon material is so covered with the binder that the surface area of the carbon material contributable to the charging and discharging reaction reduces, the carbon material fails to absorb a sufficient amount of Li. As a result, metallic Li is deposited on the surface of the carbon material, and thus the safety of the battery may further be impaired.

Also, the high-rate discharge characteristics of the batteries are greatly influenced by the affinities between the non-aqueous electrolyte and the electrodes, which depend on the amount and kind of the binders. If the permeability of the non-aqueous electrolyte into one of the electrodes is too high, the distribution of the non-aqueous electrolyte inside the battery is nonuniform, and thus the high-rate discharge characteristics are impaired.

BRIEF SUMMARY OF THE INVENTION

The present invention relates to a non-aqueous electrolyte secondary battery. The present invention also relates to a negative electrode for a non-aqueous electrolyte secondary battery.

More particularly, the present invention relates to a non-aqueous electrode secondary battery having a negative electrode including a specific binder and a non-aqueous electrolyte with a low salt concentration, which exhibits good high-rate discharge characteristics and low-temperature characteristics, and which also ensures high safety.

The present invention also relates to a negative electrode including a specific binder and an active material, of which the surface area contributable to the charging and discharging reaction is sufficient while securing the strength of the electrode.

Specifically, the present invention relates to a non-aqueous electrolyte secondary battery comprising: a positive electrode comprising a compound oxide containing lithium; a negative electrode comprising a carbon material; a separator interposed between the positive electrode and the negative electrode; and a non-aqueous electrolyte comprising a non-aqueous solvent and $LiPF_6$ dissolved therein, wherein the negative electrode contains 0.6 to 1.7 parts by weight of a particulate modified styrene-butadiene rubber and 0.7 to 1.2 parts by weight of a thickening agent per 100 parts by weight of the carbon material where the total amount of the particulate modified styrene-butadiene rubber and the thickening agent is 1.3 to 2.4 parts by weight per 100 parts by weight of the carbon material, and the concentration of $LiPF_6$ in the non-aqueous electrolyte is 0.6 to 1.05 mole/liter.

Herein, the particulate modified styrene-butadiene rubber preferably contains a copolymer comprising an acrylonitrile unit, a styrene unit, and a butadiene unit.

All or a part of the copolymer is preferably in a form of a core-shell type particle.

In a FT-IR absorption spectrum of the copolymer comprising an acrylonitrile unit, a styrene unit, and a butadiene unit, the intensity of the absorption peak attributed to $C\equiv N$ stretching vibration in the acrylonitrile unit is preferably 0.1 to 2, and more preferably 0.1 to 0.5 times the intensity of the absorption peak attributed to $C=C$ stretching vibration in the butadiene unit.

It is preferable that the mean particle size of the particulate modified styrene-butadiene rubber is 0.05 to 0.4 µm.

It is also preferable that the thickening agent is carboxymethyl cellulose.

It is still also preferable that the concentration of $LiPF_6$ in the non-aqueous electrolyte is 0.7 to 0.9 mole/liter.

The positive electrode preferably contains 0.4 to 2 parts by weight of a particulate modified acrylic rubber per 100 parts by weight of the compound oxide containing lithium.

The particulate modified acrylic rubber preferably contains a copolymer comprising a 2-ethylhexylacrylate unit, an acrylic acid unit, and an acrylonitrile unit.

In a FT-IR absorption spectrum of the copolymer comprising a 2-ethylhexylacrylate unit, an acrylic acid unit, and an acrylonitrile unit, the intensity of the absorption peak attributed to $C=O$ stretching vibration in the 2-ethylhexylacrylate unit and acrylic acid unit is preferably 3 to 50 times the intensity of the absorption peak attributed to $C\equiv N$ stretching vibration in the acrylonitrile unit.

The present invention also relates to a negative electrode for a non-aqueous electrolyte secondary battery comprising: a carbon material as an active material; 0.6 to 1.7 parts by weight of the particulate modified styrene-butadiene rubber as a binder per 100 parts by weight of the carbon material; and 0.7 to 1.2 parts by weight of a thickening agent per 100 parts by weight of the carbon material, wherein the total amount of the particulate modified styrene-butadiene rubber and the thickening agent is 1.3 to 2.4 parts by weight per 100 parts by weight of the carbon material.

The present invention still also relates to a negative electrode for a non-aqueous electrolyte secondary battery comprising: a carbon material as an active material; and the particulate modified styrene-butadiene rubber as a binder; wherein the surface area of the carbon material is 300 to 600 $m^2$ per 1 gram of the particulate modified styrene-butadiene rubber.

Note that in the FT-IR absorption spectrum, the intensity of the absorption peak is obtained as the height of the absorption peak from the base line of the spectrum.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
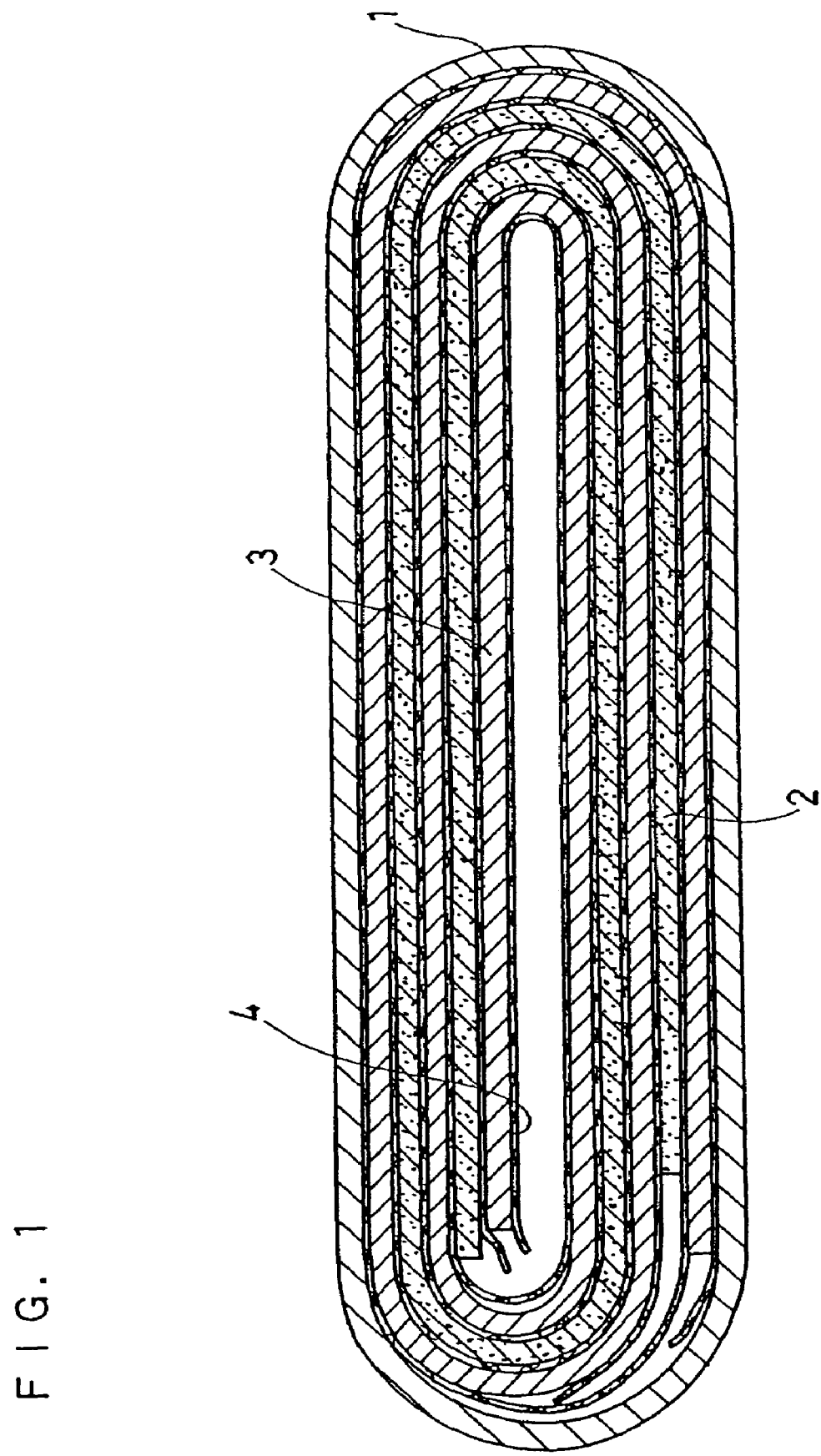
FIG. 1 is a cross-sectional view of a rectangular battery as an example of the non-aqueous electrolyte secondary battery of the present invention.

The non-aqueous electrolyte secondary battery of the present invention uses a negative electrode including a specific binder and a thickening agent at a specific ratio, and a non-aqueous electrolyte with a low salt concentration, to improve the high-rate discharge characteristics, the low-temperature characteristics, and the safety of the battery. When a positive electrode including a specific binder of a specific amount is used together with the negative electrode and the non-aqueous electrolyte described above, a further improved battery is provided.

The negative electrode of the present invention includes a negative electrode material mixture and a core member, for example.

The negative electrode material mixture is prepared by blending a carbon material as an active material, a particulate modified styrene-butadiene rubber and a thickening agent at a predetermined ratio. The term "modified" of the particulate modified styrene-butadiene rubber used herein means that the particulate modified styrene-butadiene rubber contains at least an acrylonitrile unit.

The negative electrode is produced by providing the negative electrode material mixture to the core member, which is made of metal foil such as copper foil or punched metal, rolling the resultant member, and cutting the rolled member.

From the viewpoint of reduction in size and weight of the battery, the thickness of the core member is generally about 8 to 20 μm, and the thickness of the negative electrode is generally 80 to 200 μm.

A carbon powder such as a graphite powder is used as the carbon material that is the negative electrode active material. In particular, flake graphite and a spherical artificial graphite are preferably used. The mean particle size of the carbon powder is 20 to 30 μm, for example. The specific surface area of the carbon powder is 2 to 5 $m^2/g$, for example.

The particulate modified styrene-butadiene rubber preferably contains a copolymer comprising an acrylonitrile unit, a styrene unit, and a butadiene unit.

The copolymer is preferably in a form of a core-shell type particle. The core portion of the core-shell type particle has rubber-like elasticity and is made of a copolymer comprising an acrylonitrile unit, a styrene unit, a butadiene unit and an acrylate unit, for example, which is sufficiently cross-linked by use of an appropriate cross linking agent. The shell portion is made of a highly viscous polymer such as a copolymer comprising an acrylate unit and a styrene unit, for example.

The core-shell type particles are obtained in the following two-stage process, for example. First, a raw material monomer mixture for the core portion including a cross linking agent is polymerized to produce a latex. In this process, high modulus of elasticity is imparted to the core portion by mixing acrylonitrile in the raw material monomer mixture for the core portion. Thereafter, a raw material monomer mixture for the shell portion is mixed with the latex to conduct graft-copolymerization to obtain the core-shell type particles.

The above copolymer in a form of a core-shell type particle preferably comprises an acrylonitrile unit and a butadiene unit so that, in an absorption spectrum obtained by FT-IR measurement of the copolymer, the intensity of the absorption peak attributed to the C≡N stretching vibration in the acrylonitrile unit is 0.1 to 2 times the intensity of the absorption peak attributed to the C=C stretching vibration in the butadiene unit. If the intensity of the peak attributed to the C≡N stretching vibration is less than 0.1 times the intensity of the peak attributed to the C=C stretching vibration, the rubber-like elasticity of the modified styrene-butadiene rubber is insufficient. As a result, the particulate modified styrene-butadiene rubber fails to provide a sufficient strength to the negative electrode. In addition, the surface of the active material is excessively covered with the modified styrene-butadiene rubber. On the contrary, if the intensity of the absorption peak attributed to the C≡N stretching vibration is more than twice the intensity of the absorption peak attributed to the C=C stretching vibration, the stickiness of the particulate modified styrene-butadiene rubber is insufficient. As a result, the negative electrode material mixture tends to easily come off from the core member.

The mean particle size of the particulate modified styrene-butadiene rubber is preferably 0.05 to 0.4 μm. When the mean particle size is in this range, a sufficiently strong negative electrode can be obtained using a small amount of the particulate modified styrene-butadiene rubber. If the mean particle size is too small, most of the surface of the active material is covered with the particulate modified styrene-butadiene rubber. If the mean particle size is too large, on the other hand, the distance between the adjacent active material particles is so large that the conductivity inside the negative electrode decreases.

The amount of the particulate modified styrene-butadiene rubber in the negative electrode material mixture is 0.6 to 1.7 parts by weight per 100 parts by weight of the carbon material as the negative electrode active material. If the amount of the particulate modified styrene-butadiene rubber is too small, the negative electrode fails to have a sufficient strength, and thus the mixture tends to easily come off from the core member. If the amount is too large, on the other hand, the reaction surface area of the active material become so small that the high-rate discharge characteristics deteriorate.

In the conventional case of using PVDF as the binder, the preferred amount of the binder in the negative electrode material mixture is 5 to 10 parts by weight per 100 parts by weight of the carbon material. In the case of SBR, the amount is preferably 2 to 5 parts by weight. This indicates that the negative electrode material mixture according to the present invention includes a significantly-reduced amount of the binder compared with the conventional negative electrode material mixture.

The surface area of the carbon material included in the negative electrode is preferably 300 to 600 $m^2$ per 1 gram of the particulate modified styrene-butadiene rubber included in the negative electrode. If the surface area of the carbon material per 1 gram of the particulate modified styrene-butadiene rubber is less than 300 $m^2$, the active material is excessively covered with the binder, resulting in deterioration of the battery charging characteristics and thus shortening the cycle life of the battery. If the surface area is more than 600 $m^2/g$, the adhesion of the negative electrode material mixture to the core member decreases due to an insufficient amount of the binder.

As the thickening agent mixed in the negative electrode material mixture, used are cellulose type thickening agents such as carboxymethyl cellulose (CMC) and/or a copolymer comprising an ethylene unit and a vinyl alcohol unit, for example. These may be used alone or in combination of two or more of them. Among these thickening agents, CMC is preferably used.

The amount of the thickening agent in the negative electrode material mixture is suitably 0.7 to 1.2 parts by weight per 100 parts by weight of the carbon material as the negative electrode active material. If the amount of the thickening agent is too small, the negative electrode material mixture fails to become pasty and thus tends to easily come off from the core member. If the amount is too large, on the other hand, the active material is covered with the thickening agent too much, resulting in decrease of the reaction surface area.

Herein, it is effective that the total amount of the particulate modified styrene-butadiene rubber and the thickening agent should be 1.3 to 2.4 parts by weight per 100 parts by weight of the carbon material as the negative electrode active material. If the total amount is less than 1.3 parts by weight, the active material particles fail to be sufficiently bound with each other, resulting in insufficient strength of the negative electrode. If the total amount is too large, the active material is excessively covered with the binder and the thickening agent, resulting in decrease of the reaction surface area.

In the present invention, the positive electrode includes a positive electrode material mixture and a core member, for example.

The positive electrode material mixture is prepared by blending a positive electrode active material, a conductive agent and a binder at a predetermined ratio.

The positive electrode is obtained by providing the positive electrode material mixture to the core member, which is made of metal foil such as aluminum foil or punched metal, rolling the resultant member, and cutting the rolled member. From the viewpoint of reduction in size and weight of the battery, the thickness of the core member is generally about 8 to 20 μm, and the thickness of the positive electrode is generally 80 to 200 μm.

The positive electrode active material includes a compound oxide containing lithium such as $LiCoO_2$, $LiNiO_2$ or $LiMn_2O_4$, for example. These may be used alone or in combination of two or more of them.

As the conductive agent mixed in the positive electrode material mixture, used are a natural graphite such as flake graphite, an artificial graphite such as vapor-phase growth graphite and a carbon black such as acetylene black. These may be used alone or in combination of two or more of them.

As the binder mixed in the positive electrode material mixture, used are a particulate modified acrylic rubber and/or PVDF, for example. Among these, a particulate modified acrylic rubber is preferable. A particulate modified acrylic rubber is available, for example, in a form of a dispersion with water or an organic solvent as the dispersion medium. A dispersion using an organic solvent is preferable. The mean particle size of the particulate modified acrylic rubber is preferably 0.05 to 0.3 μm. When the mean particle size is in this range, a positive electrode which is nicely balanced in strength, active material density and porosity is obtained.

The term "modified" of the particulate modified acrylic rubber used herein means that the particulate modified acrylic rubber contains at least an acrylonitrile unit.

The particulate modified acrylic rubber contains preferably a copolymer comprising a 2-ethylhexylacrylate unit, an acrylic acid unit, and an acrylonitrile unit. Also preferably, in an absorption spectrum obtained by FT-IR measurement of the copolymer, the intensity of the absorption peak attributed to the C=O stretching vibration in the 2-ethylhexylacrylate unit and the acrylic acid unit is 3 to 50 times the intensity of the absorption peak attributed to the C≡N stretching vibration in the acrylonitrile unit. If the intensity of the peak attributed to the C=O stretching vibration is less than 3 times the intensity of the peak attributed to the C≡N stretching vibration, the stickiness of the particulate modified acrylic rubber is insufficient. If the intensity of the peak attributed to the C=O stretching vibration is more than 50 times the intensity of the peak attributed to the C≡N stretching vibration, the rubber-like elasticity of the particulate modified acrylic rubber is insufficient, and thus the strength of the positive electrode is lowered.

The particulate modified acrylic rubber is preferably in a form of a core-shell type particle. The core portion of the core-shell type particle has rubber-like elasticity, and is made of a copolymer comprising an acrylonitrile unit, for example, which is sufficiently cross-linked by use of an appropriate cross linking agent. The shell portion is made of a highly viscous polymer such as a copolymer comprising a 2-ethylhexylacrylate unit and an acrylic acid unit, for example. The core-shell type particles can be produced by the similar two-stage process to that described above.

The amount of the particulate modified acrylic rubber in the positive electrode material mixture is preferably 0.4 to 2 parts by weight per 100 parts by weight of the positive electrode active material. If the amount of the particulate modified acrylic rubber is too small, the positive electrode fails to have a sufficient strength, and thus the mixture tends to easily come off from the core member. If the amount is too large, on the other hand, the porosity of the positive electrode is low, and thus the reaction surface area of the active material is small. This deteriorates the high-rate discharge characteristics.

In the non-aqueous electrolyte secondary battery of the present invention, by using the particulate modified acrylic rubber as the binder in the positive electrode material mixture, suitable permeability of the non-aqueous electrolyte into both of the negative electrode and the positive electrode is attained. In addition, the permeability of the positive electrode side and that of the negative electrode side are well balanced, and thus the distribution of the non-aqueous electrolyte inside the battery is uniform. Therefore, the resultant battery exhibits excellent low-temperature characteristics and high-rate discharge characteristics.

The permeability of the non-aqueous electrolyte into an electrode can be evaluated by observing the contact angle between the surface of the electrode and the non-aqueous electrolyte. The value of the contact angle is preferably 10 to 30° although the value varies depending on the kind of the non-aqueous electrolyte and active material density of the electrode. If the contact angle is too small, the electrode absorbs the non-aqueous electrolyte so excessively that the high-rate discharge characteristics of the resultant battery become insufficient. If the contact angle is too large, on the other hand, the electrode hardly absorbs the non-aqueous electrolyte. In this case, also, the high-rate discharge characteristics of the battery deteriorate.

In the FT-IR measurement, the absorption spectra of the particulate modified styrene-butadiene rubber and the particulate modified acrylic rubber may be measured by using these materials applied on a KBr plate, respectively. In general, the absorption peak attributed to the C=C stretching vibration in the butadiene unit is observed near 880 to 940 cm$^{-1}$. The absorption peak attributed to the C=O stretching vibration in the 2-ethylhexylacrylate unit and the acrylic acid unit is observed near 1700 to 1760 cm$^{-1}$. The absorption peak attributed to the C≡N stretching vibration in the acrylonitrile unit is observed near 2200 to 2280 cm$^{-1}$.

The positive electrode and the negative electrode are laminated with a separator interposed therebetween, to form an electrode group. The electrode group may be wound. As the separator, used is a polyethylene micro-porous film, for example, having a thickness of 10 to 40 μm, in general. In the case of producing a rectangular battery, the wound electrode group is compressed in diametrical direction to obtain a roughly elliptic section.

FIG. 1 is a transverse cross-sectional view of a rectangular battery as an example of the non-aqueous electrolyte battery of the present invention, cut along the plane parallel to the winding direction of the electrode group. Referring to FIG. 1, a rectangular battery case 1 is charged with the electrode group. In the electrode group, a sheet-like positive electrode plate 2 and a sheet-like negative electrode plate 3 are laminated with a separator 4 interposed therebetween, wound and compressed to have a certain ellipticity.

As the non-aqueous solvent used for the non-aqueous electrolyte, those conventionally used for lithium ion secondary batteries can be used without any limitation. Examples of such non-aqueous solvents include ethylene carbonate, dimethyl carbonate, diethyl carbonate, ethylmethyl carbonate, and propylene carbonate. These may be used alone or in combination of two or more of them.

The concentration of LiPF$_6$ in the non-aqueous electrolyte is 0.6 to 1.05 mole/liter. If the concentration of LiPF$_6$ is less than 0.6 mole/liter, the battery performance is deteriorated. If the concentration is more than 1.05 mole/liter, the safety of the battery is impaired. In order to obtain a non-aqueous electrolyte secondary battery exhibiting good high-rate discharge characteristics and low-temperature characteristics and ensuring high safety, the concentration of LiPF$_6$ is preferably 0.7 to 0.9 mole/liter.

Hereinafter, the present invention will be described specifically by way of examples. It should be noted that the present invention is not limited to the following examples.

EXAMPLES 1 TO 9 AND COMPARATIVE EXAMPLES 1 TO 10

Batteries A1 to S1 were produced in the manner described below, and the characteristics of the resultant batteries were evaluated.

(i) Production of Negative Electrode

Negative electrode material mixtures having predetermined compositions for batteries A1 to S1 were prepared using predetermined binders. Flake graphite was used as the negative electrode active material, and carboxymethyl cellulose (CMC) was used as the thickening agent. As the binder, those shown in Table 1 were used. In Table 1, also shown are the respective amounts of the binder and the thickening agent, as well as the total amount thereof, per 100 parts by weight of the active material in the negative electrode material mixture for each battery.

TABLE 1

| Example No. | Battery | Binder | Amount (part(s) by weight) | | | Salt concentration in electrolyte (M) |
| | | | Binder | Thickening agent | Total | |
| --- | --- | --- | --- | --- | --- | --- |
| Comparative Ex. 1 | A1 | BM400B | 1.2 | 1.2 | 2.4 | 1.1 |
| Ex. 1 | B1 | BM400B | 1.2 | 1.2 | 2.4 | 1.05 |
| Ex. 2 | C1 | BM400B | 1 | 1 | 2 | 0.9 |
| Comparative Ex. 2 | D1 | MPE | 1 | 1 | 2 | 0.9 |
| Comparative Ex. 3 | E1 | SBR | 1 | 1 | 2 | 0.9 |
| Comparative Ex. 4 | F1 | PVDF | 4 | 0 | 4 | 0.9 |
| Ex. 3 | G1 | BM400B | 1 | 1 | 2 | 0.7 |
| Comparative Ex. 5 | H1 | BM400B | 0.5 | 1.2 | 1.7 | 0.6 |
| Ex. 4 | I1 | BM400B | 0.6 | 0.7 | 1.3 | 0.6 |
| Ex. 5 | J1 | BM400B | 0.6 | 1.2 | 1.8 | 0.6 |
| Comparative Ex. 6 | K1 | BM400B | 0.6 | 1.3 | 1.9 | 0.6 |
| Ex. 6 | L1 | BM400B | 1 | 1 | 2 | 0.6 |
| Ex. 7 | M1 | BM400B | 1.2 | 1.2 | 2.4 | 0.6 |
| Ex. 8 | N1 | BM400B | 1.4 | 1 | 2.4 | 0.6 |

TABLE 1-continued

| Example No. | Battery | Binder | Amount (part(s) by weight) | | | Salt concentration in electrolyte (M) |
| --- | --- | --- | --- | --- | --- | --- |
| | | | Binder | Thickening agent | Total | |
| Comparative Ex. 7 | O1 | BM400B | 1.4 | 1.2 | 2.6 | 0.6 |
| Ex. 9 | P1 | BM400B | 1.7 | 0.7 | 2.4 | 0.6 |
| Comparative Ex. 8 | Q1 | BM400B | 1.7 | 0.6 | 2.3 | 0.6 |
| Comparative Ex. 9 | R1 | BM400B | 1.8 | 0.7 | 2.5 | 0.6 |
| Comparative Ex. 10 | S1 | BM400B | 0.6 | 0.7 | 1.3 | 0.55 |
| Ex. 10 | T1 | BM400B | 1 | 1 | 2 | 0.9 |

Details of the binders shown in Table 1 are as follows.
BM400B: Particulate modified styrene-butadiene rubber having a mean particle size of 0.2 μm, manufactured by Nippon Zeon Co., Ltd.
MPE: Modified polyethylene
SBR: Styrene-butadiene rubber (unmodified)
PVDF: Polyvinylidene difluoride In the absorption spectrum obtained by FT-IR measurement of BM400B, the intensity of the absorption peak attributed to the C≡N stretching vibration in the acrylonitrile unit is 0.5 times the intensity of the absorption peak attributed to the C=C stretching vibration in the butadiene unit.

Figure 2:
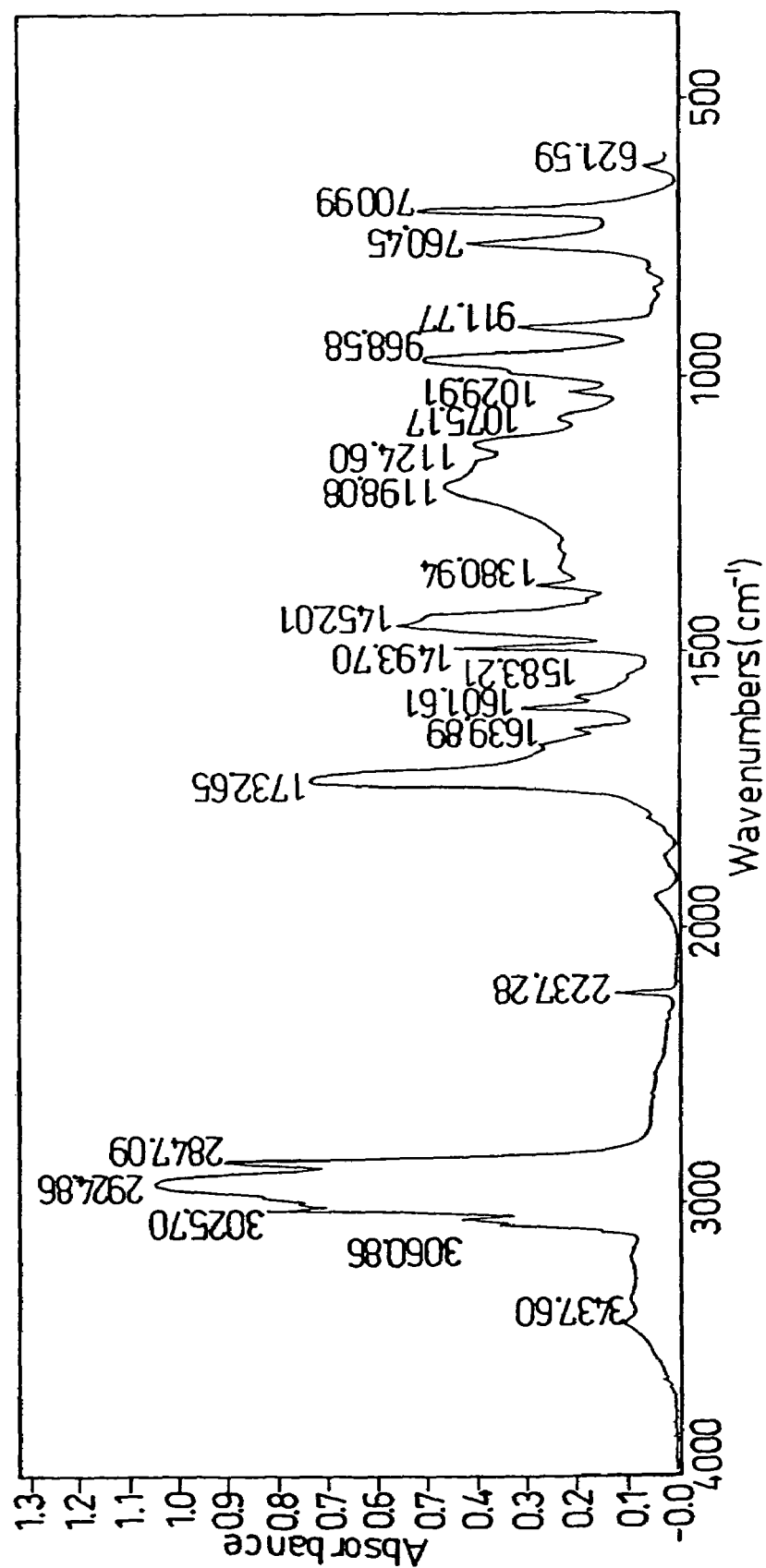
FIG. 2 is an example of an absorption spectrum obtained by FT-IR measurement of a particulate modified styrene-butadiene rubber.

The absorption spectrum is shown in FIG. 2, which is obtained by the measurement using microscopic FT-IR; Continu μm with AVATAR-360 as a light source manufactured by Nicolet Instrument Corp., under the following conditions:
Number of sample scans: 32
Number of background scans: 32
Resolving power: 4000
Sample gain: 1.0

A sample for the measurement was prepared by dissolving BM400B in N-methyl-2-pyrrolidone, applying the obtained solution to a KBr plate, and drying the plate.

In FIG. 2, the absorption peak observed near 2237 $cm^{-1}$ is attributed to the C≡N stretching vibration in the acrylonitrile unit, and the absorption peak observed near 911 $cm^{-1}$ is attributed to the C=C stretching vibration in the butadiene unit.

Figure 3:
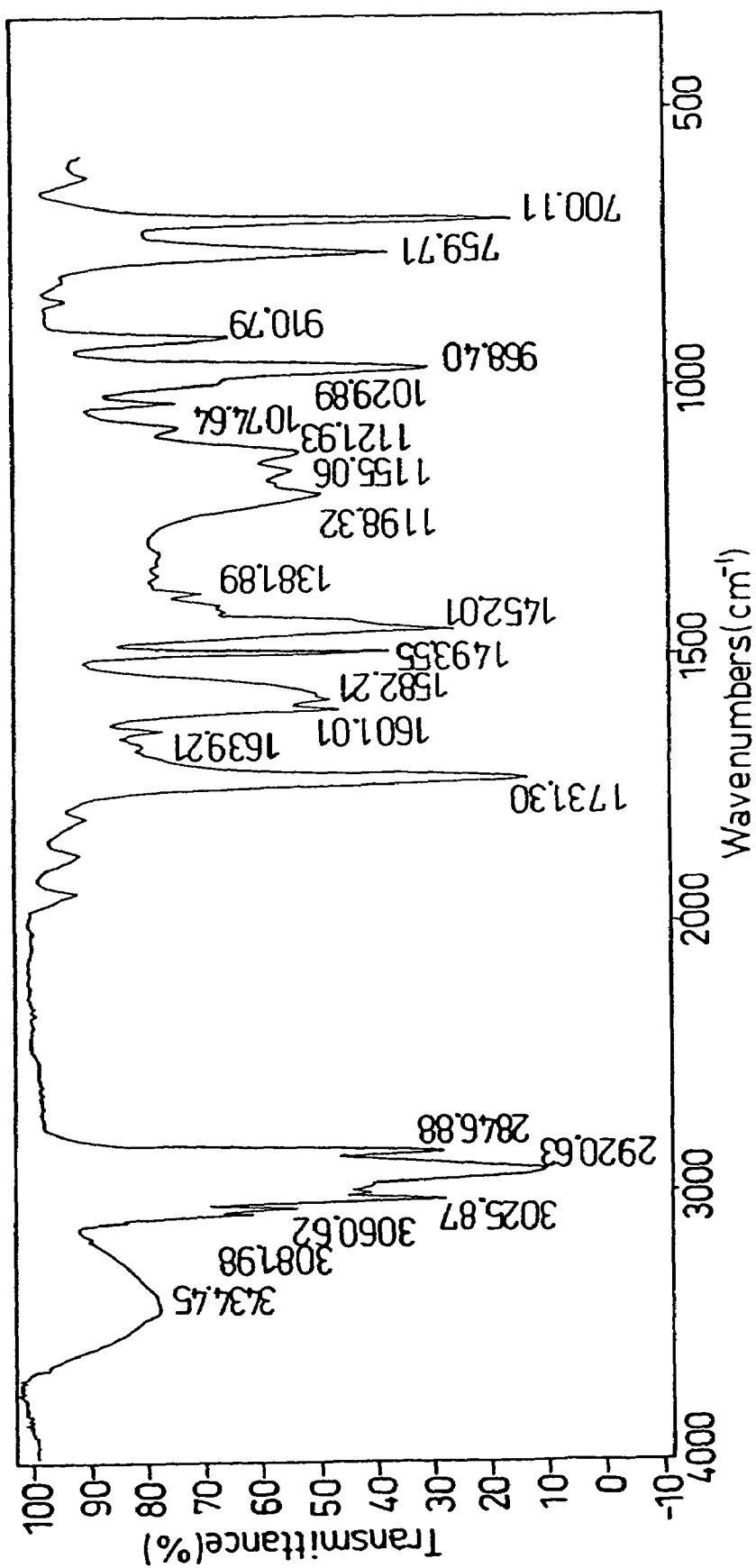
FIG. 3 is an example of a transmission spectrum obtained by FT-IR measurement of SBR.

For comparison, a transmission spectrum obtained by FT-IR measurement of common unmodified SBR is shown in FIG. 3. The conditions, instrument, and the like are the same as those used for the measurement of the spectrum in FIG. 2. In FIG. 3, there is observed no absorption peak attributed to the C≡N stretching vibration in the acrylonitrile unit near 2237 $cm^{-1}$.

Each of the resultant negative electrode material mixture comprising the active material, the binder, and the thickening agent was applied to both surfaces of a core member made of 15 μm thick copper foil, rolled to a thickness of 140 μm, and cut to a predetermined length, to obtain a negative electrode. A lead made of the same material as that of the core member was connected to the negative electrode.

(ii) Production of Positive Electrode

Four parts by weight of PVDF as the binder and 3 parts by weight of acetylene black as the conductive agent were blended with 100 parts by weight of $LiCoO_2$, to obtain a positive electrode material mixture. The resultant positive electrode material mixture was applied to both surfaces of a core member made of 20 μm thick aluminum foil, rolled to a predetermined thickness, and cut to a predetermined length, to obtain a positive electrode. A lead made of the same material as that of the core member was connected to the positive electrode.

(iii) Production of Battery

The positive electrode and each of the negative electrodes obtained in the above manner were laminated with a separator interposed therebetween and then wound to obtain an electrode group. A polyethylene micro-porous film having a thickness of 27 μm was used as the separator. The wound electrode group was compressed in diametrical direction to have a roughly elliptic section.

For preparation of a non-aqueous electrolyte, $LiPF_6$ was dissolved in a mixture of equal volumes of ethylene carbonate and ethylmethyl carbonate as a non-aqueous solvent so that the salt concentration by mole/liter (M) was as shown in Table 1 for each battery.

The electrode group was housed in a predetermined aluminum case with insulating rings placed on the top and bottom surfaces of the electrode group with 3.2 g of the non-aqueous electrolyte. The leads of the negative and positive electrodes were connected to predetermined positions, respectively. Then, the opening of the case was sealed with a sealing plate, to complete each of the batteries A1 to S1. Each of the batteries is in the shape of a rectangle having a width of 30 mm, a height of 48 mm, and a thickness of 5 mm, and has a nominal capacity of 600 mAh.

The resultant batteries were evaluated in the following points.

(i) Low-temperature Characteristics

Batteries A1 to S1 were charged until the battery voltage reached 4.2 V at 600 mA in an atmosphere of 0° C., and the charged capacity ($C_{LT}$) in this state was measured. The results are shown in Table 2.

(ii) High-rate Discharge Characteristics

Batteries A1 to S1 were charged until the battery voltage reached 4.2 V at 600 mA and then discharged until the battery voltage decreased to 3 V at 120 mA, in an atmosphere of 20° C. Subsequently, the batteries were charged until the battery voltage reached 4.2 V at 600 mA and then discharged until the battery voltage decreased to 3 V at 1200 mA. The discharge capacities were measured at the two discharging operations, and the ratio ($C_{1200}/C_{120}$) of the latter to the former was calculated. The results expressed as a percentage are shown in Table 2.

(iii) Capacity Maintenance Rate

For each of the batteries A1 to S1, the operation of charging the battery until the battery voltage reached 4.2 V at 600 mA and then discharging the battery until the battery voltage decreased to 3 V at 600 mA was repeated 200 times in an atmosphere of 20° C. The ratio ($C_{200th}/C_{1st}$) of the discharge capacity at the 200th operation to that at the first operation was calculated. The results expressed as a percentage are shown in Table 2.

(iv) Overcharge Test

For each of the batteries A1 to S1, charging was continued at 1260 mA in an atmosphere of 20° C. and stopped when the battery surface temperature reached 80° C. The batteries were then left to stand for a while, to examine the surface temperature. The battery of which the surface temperature rose to 90° C. or more was evaluated as "X", while the battery of which the surface temperature was less than 90° C. was evaluated as "○". The results are shown in Table 2. The batteries evaluated as "○" can be considered to have sufficient safety.

TABLE 2

| Example No. | Battery | $C_{LT}$ (mAh) | $C_{1200}/C_{120}$ (%) | $C_{200th}/C_{1st}$ (%) | Over charge test |
|---|---|---|---|---|---|
| Comparative Ex. 1 | A1 | 297 | 95 | 94 | X |
| Ex. 1 | B1 | 297 | 95 | 93 | ○ |
| Ex. 2 | C1 | 298 | 95 | 93 | ○ |
| Comparative Ex. 2 | D1 | 208 | 91 | 85 | X |
| Comparative Ex. 3 | E1 | 285 | 94 | 92 | X |
| Comparative Ex. 4 | F1 | 216 | 92 | 87 | X |
| Ex. 3 | G1 | 272 | 86 | 87 | ○ |
| Comparative Ex. 5 | H1 | — | — | — | — |
| Ex. 4 | I1 | 249 | 75 | 82 | ○ |
| Ex. 5 | J1 | 242 | 73 | 80 | ○ |
| Comparative Ex. 6 | K1 | 146 | 53 | 53 | X |
| Ex. 6 | L1 | 235 | 72 | 79 | ○ |
| Ex. 7 | M1 | 227 | 71 | 76 | ○ |
| Ex. 8 | N1 | 200 | 67 | 72 | ○ |
| Comparative Ex. 7 | O1 | 120 | 47 | 45 | X |
| Ex. 9 | P1 | 214 | 70 | 74 | ○ |
| Comparative Ex. 8 | Q1 | — | — | — | — |
| Comparative Ex. 9 | R1 | 164 | 60 | 62 | X |
| Comparative Ex. 10 | S1 | 148 | 49 | 63 | ○ |
| Ex. 10 | T1 | 320 | 97 | 95 | ○ |

From the results in Table 2, the followings are found.

Among the batteries in which the salt concentration in the non-aqueous electrolyte is in the range of 0.6 to 1.05 mole/liter, those that use the particulate modified styrene-butadiene rubber in the negative electrode material mixture exhibit high safety. On the contrary, battery A1 of comparative example 1, in which the salt concentration in the non-aqueous electrolyte is 1.1 mole/liter, is insufficient in safety. Battery S1 of comparative example 10, in which the salt concentration in the non-aqueous electrolyte is 0.55 mole/liter, is insufficient in low-temperature characteristics, high-rate discharge characteristics, and capacity maintenance rate.

Batteries D1 to F1 of comparative examples 2 to 4, in which the particulate modified styrene-butadiene rubber is not used in the negative electrode material mixture, are insufficient in safety and low-temperature characteristics. In particular, in battery F1, which used conventionally used PVDF as the binder in the negative electrode material mixture, the electrode plates were cracked during the production of the electrode group and have insufficient strength although the amount of the binder was larger than that in the other batteries.

Table 2 indicates that the preferred amount of the particulate modified styrene-butadiene rubber is 0.6 to 1.7 parts by weight per 100 parts by weight of the active material. Battery H1, which included the binder in the amount of 0.5 parts by weight, had difficulty in production of a negative electrode and thus failed to be evaluated. Battery R1, which included the binder in the amount of 1.8 parts by weight, was insufficient in high-rate discharge characteristics and capacity maintenance rate.

Table 2 also indicates that the preferred amount of the thickening agent is 0.7 to 1.2 parts by weight per 100 parts by weight of the active material. Battery Q1, which included the thickening agent in the amount of 0.6 parts by weight, had difficulty in production of a negative electrode and thus failed to be evaluated. Battery K1, which included the thickening agent in the amount of 1.3 parts by weight, was insufficient in high-rate discharge characteristics and capacity maintenance rate.

Table 2 further indicates that the preferred total amount of the particulate modified styrene-butadiene rubber and the thickening agent is 1.3 to 2.4 parts by weight per 100 parts by weight of the active material. Batteries O1 and R1, of which the total amount was 2.5 parts by weight or more, were insufficient in high-rate discharge characteristics and capacity maintenance rate.

EXAMPLE 10

The positive electrode material mixture was prepared in the same manner as that employed in Example 2 except that 0.53 parts by weight of BM500B as the binder and 0.27 parts by weight of BM700H as the thickening agent were blended with 100 parts by weight of $LiCoO_2$. Using the resultant positive electrode material mixture, battery T1 was produced and evaluated, as in battery C1 of Example 2. The results are shown in Table 2.

Details of the binder and the thickening agent used in the positive electrode material mixture are as follows.

BM500B: Particulate modified acrylic rubber manufactured by Nippon Zeon Co., Ltd.

BM700H: A copolymer comprising an ethylene unit and a vinyl alcohol unit manufactured by Nippon Zeon Co., Ltd.

Figure 4:
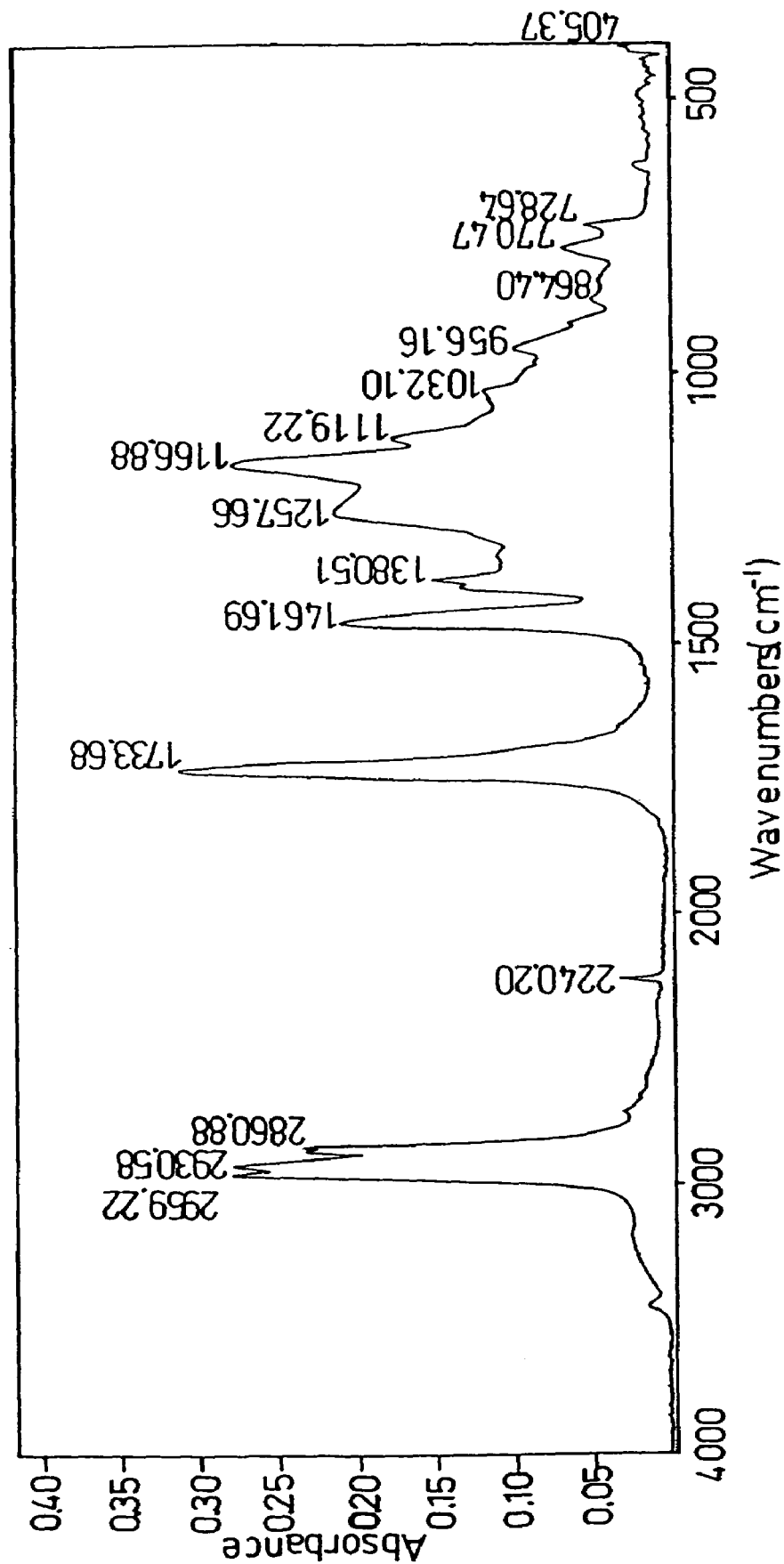
FIG. 4 is an example of an absorption spectrum obtained by FT-IR measurement of a particulate modified acrylic rubber.

In the absorption spectrum obtained by FT-IR measurement of BM500B, which is shown in FIG. 4, the intensity of the absorption peak attributed to the C=O stretching vibration in the 2-ethylhexylacrylate unit and the acrylic acid unit is about 10 times the intensity of the absorption peak attributed to the C≡N stretching vibration in the acrylonitrile unit.

The measurement conditions, instrument, and the like are the same as those for the measurement of the spectrum in FIG. 2. In FIG. 4, the absorption peak observed near 2240 $cm^{-1}$ is attributed to the C≡N stretching vibration in the acrylonitrile unit, and the absorption peak observed near 1733 $cm^{-1}$ is attributed to the C=O stretching vibration in the 2-ethylhexylacrylate unit and the acrylic acid unit.

Figure 5:
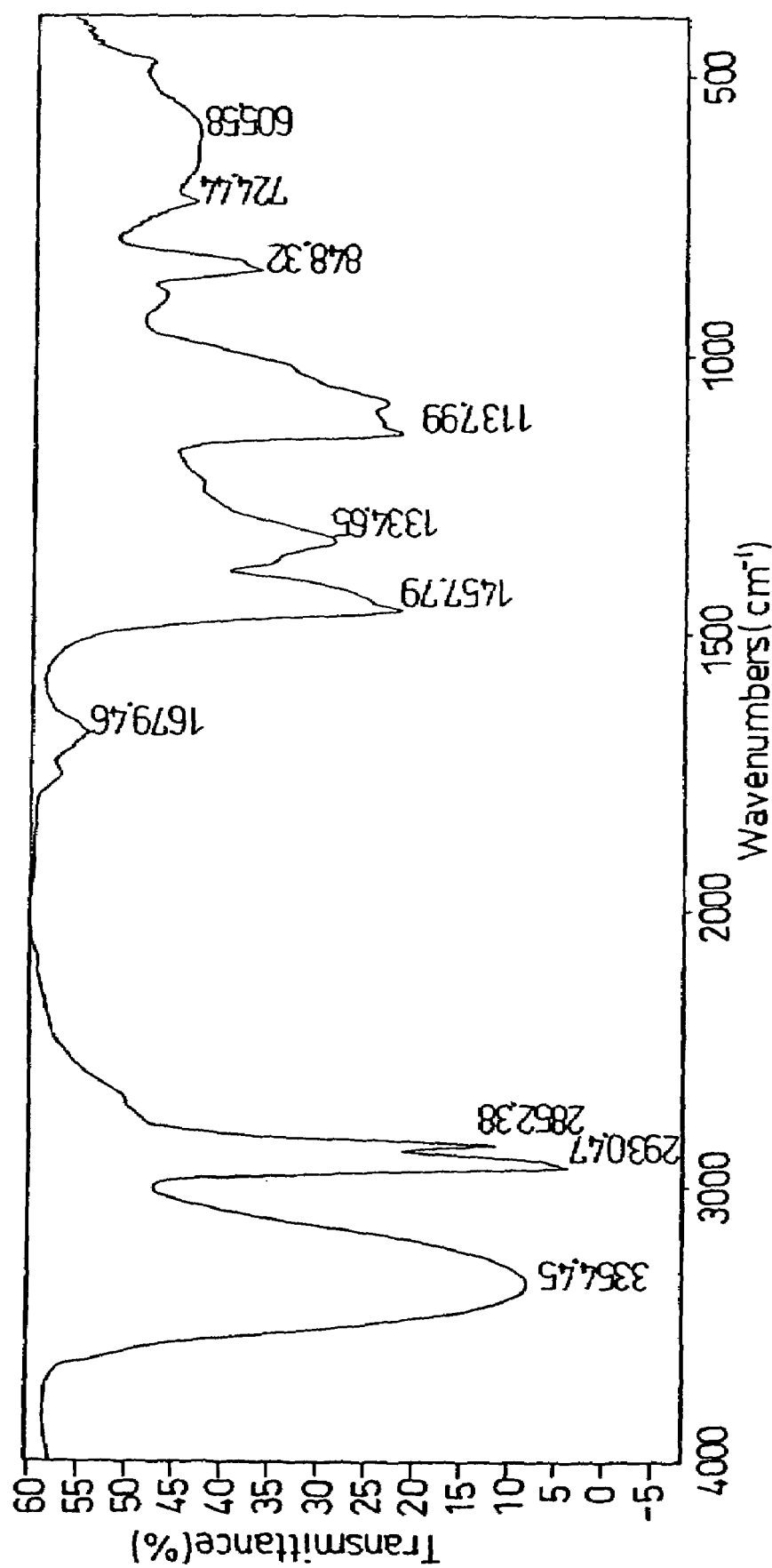
FIG. 5 is an example of a transmission spectrum obtained by FT-IR measurement of a copolymer comprising an ethylene unit and a vinyl alcohol unit.

The transmission spectrum obtained by FT-IR measurement of BM700H is shown in FIG. 5. The measurement conditions, instrument, and the like are the same as those for the measurement of the spectrum in FIG. 2. In FIG. 5, the two absorption peaks observed near 2852 cm$^{-1}$ and near 2930 cm$^{-1}$ are attributed to an OH group of the vinyl alcohol unit adjacent to the ethylene unit.

As is found from the evaluation results of Table 2, battery T1 was superior in all the low-temperature characteristics, the high-rate discharge characteristics, and the capacity maintenance rate to the batteries of Examples 1 to 9, and was sufficient in safety. This indicates that the use of the particulate modified acrylic rubber as the binder in the positive electrode material mixture dramatically improves the battery characteristics.

From the above results, it is evident that the present invention can provide a non-aqueous electrolyte secondary battery that exhibits good high-rate discharge characteristics and low-temperature characteristics and ensures high safety.

EXAMPLES 11 TO 15 AND COMPARATIVE EXAMPLES 11 TO 18

Batteries A2 to M2 were produced in the manner described below, and the characteristics of the batteries were evaluated.

(i) Production of Negative Electrode

Negative electrode material mixtures for negative electrodes of the respective batteries were prepared using artificial graphites in the forms shown in Table 3 as the active material and binders shown in Table 3. In Table 3, also shown are the specific surface area of the artificial graphite as the active material, the amount of the binder per 100 parts by weight of the active material in the negative electrode material mixture, and the value of $S_{Total}/W_{Binder}$ obtained by dividing the total surface area of the active material in the mixture by the amount of the binder in the mixture. Note that CMC as the thickening agent was mixed in the amount of 1.3 parts by weight per 100 parts by weight of the active material except for the case where PVDF was used as the binder.

The resultant negative electrode material mixture was applied to both surfaces of a core member made of 15 μm thick copper foil, rolled to a thickness of 140 μm, and cut to a predetermined length, to obtain a negative electrode. A lead made of the same material as that of the core member was connected to the negative electrode.

(ii) Production of Positive Electrode

Positive electrodes were produced in the same manner described above in relation with the batteries A1 to S1.

(iii) Production of Battery

Batteries A2 to M2 were produced in the same manner as that for the batteries A1 to S1, except for using a non-aqueous electrolyte containing 1.0 mole/liter of LiPF$_6$ dissolved in the non-aqueous solvent. Each of the batteries was in the shape of a rectangle having a width of 30 mm, a height of 48 mm, and a thickness of 5 mm, and had a nominal capacity of 600 mAh.

During production of the batteries, whether or not the negative electrode material mixture came off from the core member was examined. In Table 4, mark "X" indicates that the mixture came off, and mark "O" indicates the other results.

The resultant batteries were evaluated in the following points.

(i) Low-temperature Characteristics and Capacity Recovery Rate

Batteries A2 to M2 were charged until the battery voltage reached 4.2 V at 600 mA and then discharged until the battery voltage decreased to 3 V at 120 mA, in an atmosphere of 20° C. Subsequently, in an atmosphere of 0° C., the batteries were charged until the battery voltage reached 4.2 V at 600 mA and then discharged until the battery voltage decreased to 3 V at 600 mA. Again, in an atmosphere of 20° C., the batteries were charged until the battery voltage reached 4.2 V at 600 mA and then discharged until the battery voltage decreased to 3 V at 120 mA.

TABLE 3

| Example No. | Battery | Graphite Form | Surface area (m²/g) | Binder Kind | Amount (Part(s) by weight) | $S_{Total}/W_{Binder}$ (m²/g) |
|---|---|---|---|---|---|---|
| Comparative Ex. 11 | A2 | Bulk | 4.5 | BM400B | 0.5 | 900 |
| Ex. 11 | B2 | Bulk | 4.5 | BM400B | 0.75 | 600 |
| Ex. 12 | C2 | Bulk | 4.5 | BM400B | 1 | 450 |
| Ex. 13 | D2 | Bulk | 4.5 | BM400B | 1.5 | 300 |
| Comparative Ex. 12 | E2 | Bulk | 4.5 | BM400B | 2 | 225 |
| Comparative Ex. 13 | F2 | Bulk | 4.5 | PVDF | 4.5 | 100 |
| Comparative Ex. 14 | G2 | Bulk | 4.5 | PVDF | 7.5 | 60 |
| Comparative Ex. 15 | H2 | Bulk | 4.5 | SBR | 1.5 | 300 |
| Comparative Ex. 16 | I2 | Bulk | 4.5 | SBR | 2 | 225 |
| Comparative Ex. 17 | J2 | Bulk | 4.5 | MPE | 1.5 | 300 |
| Comparative Ex. 18 | K2 | Bulk | 4.5 | MPE | 2 | 225 |
| Ex. 14 | L2 | Spherical Bulk | 2.2 | BM400B | 0.7 | 314 |
| Ex. 15 | M2 | Spherical | 3.2 | BM400B | 1 | 320 |

The charged capacity ($C_{LT}$) at the charging until the battery voltage reached 4.2 V at 600 mA in an atmosphere of 0° C. was obtained for each battery. The results are shown in Table 4 as an indicator of the low-temperature characteristics of the battery.

Also obtained were the capacity at the first-charging in an atmosphere of 20° C. and the capacity at the second charging in an atmosphere of 20° C., and the ratio of the latter to the former was calculated. The results are shown in Table 4 as the capacity recovery rate expressed as a percentage.

(ii) Overcharge Test

The batteries used for the examination of the capacity recovery rate were charged at 1260 mA at 20° C. until the battery surface temperature became 80° C. The batteries were then left to stand for a while to examine the change of the surface temperature. In Table 4, mark "X" indicates that the surface temperature rose to 90° C. or more, and mark "○" indicates the other results.

(iii) Capacity Maintenance Rate

The capacity maintenance rates ($C_{200th}/C_{1st}$) of the batteries A2 to M2 were obtained in the same manner described above with respect to the batteries A1 to T1. The results are shown in Table 4.

tive electrode is less than 300 m². This is presumably because absorption of Li by the negative electrode active material becomes less easy and thus metallic Li is deposited on the surface of the active material. Also presumed is that this phenomenon tends to easily occur during charging at a low temperature that causes large polarization.

From the viewpoint of the low-temperature characteristics, the surface area of the carbon material per 1 gram of the particulate modified styrene-butadiene rubber in the negative electrode is most preferably in the range of 450 to 600 m².

It is also found that the cycle life significantly decreases when a binder other than the particulate modified styrene-butadiene rubber is used in the negative electrode.

As described above, according to the present invention, it is possible to secure the surface area of the active material of the negative electrode that can effectively contribute to the charging and discharging reaction while securing the strength of the negative electrode. Therefore, using the negative electrode of the present invention, it is possible to obtain a non-aqueous electrolyte secondary battery that is nicely balanced in the high-rate discharge characteristics, the low-temperature characteristics and the cycle life, and ensures high safety.

TABLE 4

| Example No. | Battery | Mixture coming off | $C_{LT}$ (mAh) | Capacity recovery rate (%) | Overcharge test | $C_{200th}/C_{1st}$ (%) |
|---|---|---|---|---|---|---|
| Comparative Ex. 11 | A2 | X | — | — | — | — |
| Ex. 11 | B2 | ○ | 156 | 99.3 | ○ | 91.2 |
| Ex. 12 | C2 | ○ | 110 | 98.8 | ○ | 90.5 |
| Ex. 13 | D2 | ○ | 65 | 86.1 | ○ | 88.3 |
| Comparative Ex. 12 | E2 | ○ | 11 | 69.4 | X | 75.4 |
| Comparative Ex. 13 | F2 | X | — | — | — | — |
| Comparative Ex. 14 | G2 | ○ | 47 | 84.4 | ○ | 74.3 |
| Comparative Ex. 15 | H2 | X | — | — | — | — |
| Comparative Ex. 16 | I2 | ○ | 56 | 86.5 | ○ | 74.5 |
| Comparative Ex. 17 | J2 | X | — | — | — | — |
| Comparative Ex. 18 | K2 | ○ | 39 | 81.1 | ○ | 70.5 |
| Ex. 14 | L2 | ○ | 52 | 85.2 | ○ | 86.7 |
| Ex. 15 | M2 | ○ | 54 | 84.8 | ○ | 87.7 |

From the results in Table 4, the followings are found.

The mixture came off from the core member when the surface area of the carbon material per 1 gram of the particulate modified styrene-butadiene rubber contained in the negative electrode was 900 m². This indicates that the strength of the negative electrode is weak when the surface area of the carbon material per 1 gram of the particulate modified styrene-butadiene rubber in the negative electrode exceeds 600 m².

An abnormal temperature rise was observed in the overcharge test when the surface area of the carbon material per 1 gram of the particulate modified styrene-butadiene rubber in the negative electrode was 225 m². This indicates that the safety of the battery may possibly be impaired when the surface area of the carbon material per 1 gram of the particulate modified styrene-butadiene rubber in the nega- Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
   a positive electrode comprising a compound oxide containing lithium;

a negative electrode comprising a carbon material; as an active material and a particulate modified styrene-butadiene rubber as a binder;

a separator interposed between said positive electrode and said negative electrode; and a non-aqueous electrolyte;

wherein the surface area of said carbon material is 300 $m^2$ to 600 $m^2$ per 1 gram of said particulate modified styrene-butadiene rubber wherein said particulate modified styrene-butadiene rubber contains a copolymer comprising an acrylonitrile unit, a styrene unit, and a butadiene unit.

2. The non-aqueous electrolyte secondary battery in accordance with claim 1, wherein said copolymer is in a form of a core-shell type particle.

3. The non-aqueous electrolyte secondary battery in accordance with claim 1, wherein, in a FT-IR absorption spectrum of said copolymer, the intensity of the absorption peak attributed to C≡N stretching vibration in said acrylonitrile unit is 0.1 to 2 times the intensity of the absorption peak attributed to C=C stretching vibration in said butadiene unit.

4. A non-aqueous electrolyte secondary battery comprising:

a positive electrode comprising a compound oxide containing lithium;

a negative electrode comprising a carbon material; as an active material and a particulate modified styrene-butadiene rubber as a binder;

a separator interposed between said positive electrode and said negative electrode; and a non-aqueous electrolyte;

wherein said particulate modified styrene-butadiene rubber contains a copolymer comprising an acrylonitrile unit, a styrene unit, and a butadiene unit, and wherein said copolymer is in a form of a core-shell type particle.

5. The non-aqueous electrolyte secondary battery in accordance with claim 4, wherein, in a FT-IR absorption spectrum of said copolymer, the intensity of the absorption peak attributed to C≡N stretching vibration in said acrylonitrile unit is 0.1 to 2 times the intensity of the absorption peak attributed to C=C stretching vibration in said butadiene unit.

* * * * *

UNITED STATES PATENT AND TRADEMARK OFFICE
CERTIFICATE OF CORRECTION

PATENT NO. : 7,150,937 B2
APPLICATION NO. : 10/943839
DATED : December 19, 2006
INVENTOR(S) : Kohei Suzuki et al.

It is certified that error appears in the above-identified patent and that said Letters Patent is hereby corrected as shown below:

On page 2 of the title page

Under item [56] under Patent Document "FOREIGN PATENT DOCUMENTS", change "JP 10-279606  10/1998" to -- JP 10-279608  10/1998 --

Signed and Sealed this

Eighth Day of May, 2007

JON W. DUDAS
*Director of the United States Patent and Trademark Office*